US011221780B2

(12) United States Patent
Walsh et al.

(10) Patent No.: US 11,221,780 B2
(45) Date of Patent: Jan. 11, 2022

(54) SIZE ADJUSTABLE VOLUMES FOR CONTAINERS

(71) Applicant: RED HAT, INC., Raleigh, NC (US)

(72) Inventors: Daniel J. Walsh, Marlboro, MA (US); Vivek Goyal, Westford, MA (US); Shishir Mahajan, Lowell, MA (US)

(73) Assignee: Red Hat, Inc., Raleigh, NC (US)

( * ) Notice: Subject to any disclaimer, the term of this patent is extended or adjusted under 35 U.S.C. 154(b) by 63 days.

(21) Appl. No.: 16/543,939

(22) Filed: Aug. 19, 2019

(65) Prior Publication Data

US 2019/0377510 A1  Dec. 12, 2019

Related U.S. Application Data

(63) Continuation of application No. 15/877,874, filed on Jan. 23, 2018, now Pat. No. 10,387,068, which is a continuation of application No. 15/051,367, filed on Feb. 23, 2016, now Pat. No. 9,916,110.

(51) Int. Cl.
*G06F 3/00* (2006.01)
*G06F 3/06* (2006.01)

(52) U.S. Cl.
CPC ............ *G06F 3/0644* (2013.01); *G06F 3/067* (2013.01); *G06F 3/0608* (2013.01); *G06F 3/0631* (2013.01); *G06F 3/0632* (2013.01); *G06F 3/0643* (2013.01); *G06F 3/0653* (2013.01); *G06F 3/0673* (2013.01)

(58) Field of Classification Search
None
See application file for complete search history.

(56) References Cited

U.S. PATENT DOCUMENTS

| | | |
|---|---|---|
| 5,897,661 A | 4/1999 | Baranovsky et al. |
| 6,523,047 B1 | 2/2003 | Rafanello et al. |
| 6,715,070 B1 | 3/2004 | Peloquin et al. |
| 7,003,780 B2 | 2/2006 | Peloquin et al. |
| 7,036,126 B2 | 4/2006 | Peloquin et al. |
| 8,806,154 B1 | 8/2014 | Gupta et al. |
| 9,135,049 B2 | 9/2015 | Mizrahi et al. |
| 2007/0118703 A1 | 5/2007 | Homma |
| 2013/0275692 A1 | 10/2013 | Kwok |
| 2016/0253351 A1 | 9/2016 | Hansen et al. |

OTHER PUBLICATIONS

Petazzoni, Jerome, "Resizing Docket Containers With the Device Mapper Plugin", Jan. 29, 2014, 4 pages.
(Continued)

*Primary Examiner* — Midys Rojas
(74) *Attorney, Agent, or Firm* — Lowenstein Sandler LLP

(57) ABSTRACT

Implementations of the disclosure provide for size adjustable volumes for containers. A method of the disclosure includes determining, by a processing device of a Platform-as-a-Service (PaaS) system, a size limitation of a container, where the size limitation is associated with disk space usage of a storage volume group. The amount of disk space used by applications of the container is monitored in view of the size limitation of the container. Responsive to determining that the amount of the disk space used by the applications of the container satisfies a threshold, a storage volume of the storage volume group is allocated to the container in view of the size limitation of the container.

20 Claims, 5 Drawing Sheets

(56) References Cited

OTHER PUBLICATIONS

"Docker and the Device Mapper Storage Driver", 15 pages (NOTE: no author named, no date given).
Eder, Jeremy, "Comprehensive Overview of Storage Scalability in Docker", Red Hat Developer Blog, Sep. 30, 2014, 22 pages.
Levine, Steven, "Red Hat Enterprise Linux 6 Logical Volume Manager Administration", LVM Administrator Guide, Edition 1, Nov. 10, 2010, 204 pages.
Walsh, Dan, "Create lvm/devmapper volume plugin to handle limited size images", Jan. 7, 2016, 2 pages.

400

Receive
a request to map a storage volume to a container associated with an execution of an application, the request comprises a size limitation for the storage volume
410

Obtain
a size of used space in the storage volume with respect to the container where the size is a summation of current usage of disk space associated with the storage volume by the application
420

Determine
whether the size of the used space meets the size limitation for the storage volume
430

Control
an increase in the size limitation for the for the storage volume mapped to the container in view of the determination
440

FIGURE 4

SIZE ADJUSTABLE VOLUMES FOR CONTAINERS

RELATED APPLICATIONS

This application is a continuation of U.S. patent application Ser. No. 15/877,874, filed Jan. 23, 2018, which is a continuation of U.S. patent application Ser. No. 15/051,367, filed Feb. 23, 2016, now U.S. Pat. No. 9,916,110, issued on Mar. 13, 2018, which are hereby incorporated by reference in its entirety.

TECHNICAL FIELD

The implementations of the disclosure relate generally to computing infrastructures and, more specifically, relate to size adjustable volumes for containers.

BACKGROUND

Containerization is an operating-system-level virtualization environment for running multiple isolated system containers on a single host machine. It is an alternative to full machine virtualization that involves encapsulating a process into a container with its own operating environment. Some containerization technologies allow each container to run on the "bare metal" of a host machine while also being able to access a shared instance of a host operating system.

BRIEF DESCRIPTION OF THE DRAWINGS

The disclosure can be understood more fully from the detailed description given below and from the accompanying drawings of various implementations of the disclosure. The drawings, however, should not be taken to limit the disclosure to the specific implementations, but are for explanation and understanding only.

The disclosure is illustrated by way of examples, and not by way of limitation, and may be more fully understood with references to the following detailed description when considered in connection with the figures, in which:

FIG. 4 illustrates a flow diagram of a method to request a size adjustable volume for a container according to an implementation of the disclosure.

DETAILED DESCRIPTION

Figure 1:
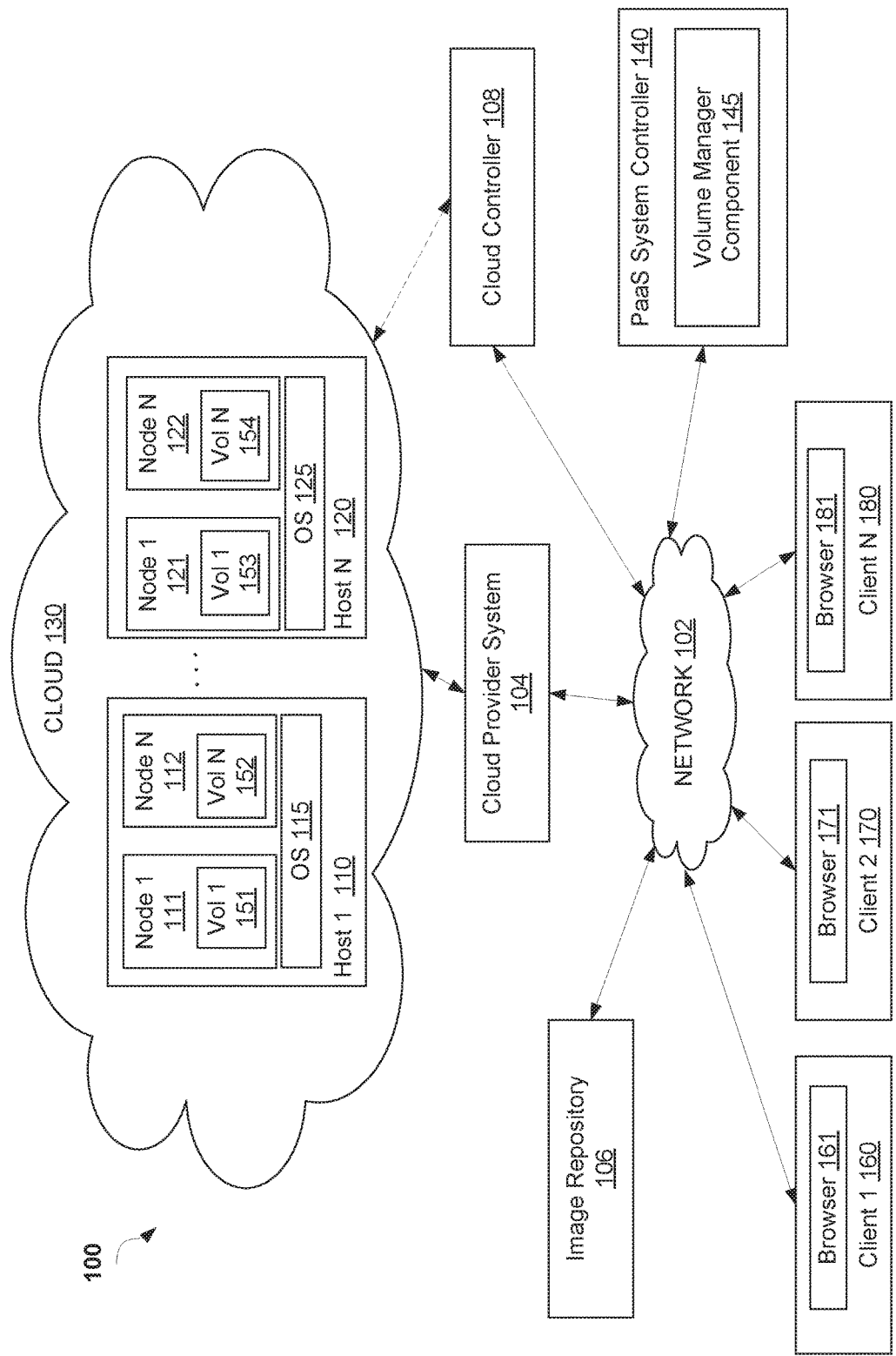
FIG. 1 is a block diagram of a network architecture in which implementations of the disclosure may operate.

The disclosure provides techniques for implementing size adjustable volumes for containers. Containers are used in various types of systems to provide a secure environment that is isolated from other processes on the system. Many Platform-as-a-Service (PaaS) systems, such as OpenShift®, utilize containers to provide certain services to clients. A PaaS system provides a platform and environment that allows clients to build applications and services over the internet. Although implementations of the disclosure are described in accordance with a certain type of system, this should not be considered as limiting the scope or usefulness of the features of the disclosure. For example, the features and techniques described herein can be used with other types of systems that utilize various kinds of containers.

In such systems that utilize containers, a client application may be executed in a container that provides a self-contained secure process space in the system. The term "application" is used to refer to any combination of software and hardware products that may perform a desired function. In some cases, an application may be a single software program that operates with a hardware platform. Some applications may use multiple software components, each of which may be written in a number of different programing languages and may execute a plurality of different application processes on the hardware platform.

In some situations, the system may want to control or otherwise limit the amount of writable storage space and/or file system locations accessible by processes within the containers. For example, the system may want to allocate a certain amount of disk space (e.g. 1 Gigabyte) for application processes of the container to be able to write content in order to improve system efficiency when a limited amount of disk space is available. Some systems may use a quota system in view of a container's UID (user identifier) to limit the storage allocated to the container. For example, the UID may be assigned to the container to allow the application processes therein to run as a particular user having certain permissions within a contained environment. By using a UID based quota system, however, controls for all processes with the same UID are set up to have the same permissions on the same file system. In such cases, if the same UID is used within two different containers on the same file system, the system cannot set up different quotas for each container associated with the UID. In addition, if a system root identifier (e.g., a user name or account that by default has access to all commands and files on a system) is used as the UID for the container, then the same quota is setup for the root identifier outside of the container.

In accordance with implementations of the disclosure, a mechanism is provided that allows a container to utilize or otherwise write to certain storage locations within a determined size limitation, while allowing multiple containers to use same UID's, including root. In one implementation, this mechanism includes providing a volume manager plugin (e.g., a modular component that can selectivity add new feature to an existing system) in a system, such as the PaaS system. The volume manger plugin can create a volume group (e.g., a pool of storage space) in which groups of information are mapped together into a contiguous logical volume across one or more physical storage disks. Using these volume groups, writeable storage spaces of various sizes may be setup and then mounted into the containers. For example, the volume group may be divided into multiple volumes in which each volume is mounted onto different containers. Once the volume group is full, the system may determine whether to add more storage space to the volume group to create more volumes for the container. Thus, the system may control the amount of writable file system space and locations available to applications processes inside of the container by preventing the applications from operating when the allocated space of the volume group associated with the container is used up.

In some situations, the system determines a size of disk space used by the container applications and may allocate more disk space to the volume group for the container if the determined size of the used space meets a threshold size.

This additional allocation of space by the system may be in view of a preexisting agreement with the client associated with the running application or other types of SLAs (Service Level Agreements). In other situations, if no pre-agreement is set up and additional space is not allocated to the volume group, the applications may be permitted to fail or may be terminated. Upon failure or termination, an error message is generated indicating that the volume group used by the container is full.

FIG. 1 is a block diagram of a network architecture 100 in which implementations of the disclosure may operate. The network architecture 100 includes a cloud 130 managed by a cloud provider system 104. The cloud provider system 104 provides nodes 111, 112, 121, 122 to execute software and/or other processes. In some implementations these nodes are virtual machines (VMs) that are hosted on a physical machine, such as host 1 110 through host N 120, implemented as part of the cloud 130. In some implementations, the host machines 110, 120 are often located in a data center. For example, nodes 111 and 112 are hosted on physical machine 110 in cloud 130 provided by cloud provider 104. When nodes 111, 112, 121, 122 are implemented as VMs, they may be executed by OSes 115, 125 on each host machine 110, 120.

In some implementations, the host machines 110, 120 are often located in a data center. Users can interact with applications executing on the cloud-based nodes 111, 112, 121, 122 using client computer systems, such as clients 160, 170 and 180, via corresponding web browser applications 161, 171 and 181. In other implementations, the applications may be hosted directly on hosts 1 through N 110, 120 without the use of VMs (e.g., a "bare metal" implementation), and in such an implementation, the hosts themselves are referred to as "nodes".

Clients 160, 170, and 180 are connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In one implementation, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from PaaS system controller 140. In view of these commands, the cloud controller 108 provides data (e.g., such as pre-generated images) associated with different applications to the cloud provider system 104. In some implementations, the data may be provided to the cloud provider 104 and stored in an image repository 106, in an image repository (not shown) located on each host 110, 120, or in an image repository (not shown) located on each VM 111, 112, 121, 122. This data may be used for the execution of applications for a multi-tenant PaaS system managed by the PaaS provider controller 140.

In one implementation, the data used for execution of applications includes application images built from pre-existing application components and source code of users managing the application. As discussed above, an image refers to data representing executables and files of the application used to deploy functionality for a runtime instance of the application. In one implementation, the image can be built using a Docker™ tool and is referred to as a Docker image. In other implementations, the application images can be built using other types of containerization technologies. An application image may be built in the PaaS system using an image build system (not shown) of the PaaS system. The image build system may be provided on components hosted by cloud 130, on a server device external to the cloud 130, or even run on nodes 111, 112, 121, 122. The image build system generates an application image for an application by combining pre-existing ready-to-run application image corresponding to core functional components of the application (e.g., a web framework, database, etc.) with source code specific to the application provided by the user. The resulting application image may be pushed to an image repository (not shown) for subsequent use in launching instances of the application images for execution in the PaaS system.

Upon receiving a command identifying specific data (e.g., application data and files, such as application images, used to initialize an application on the cloud) from the PaaS provider controller 140, the cloud provider 104 retrieves the corresponding data from the image repository 106, creates an instance of it, and loads it to the host 110, 120 for execution by nodes 111, 112, 121, 122. In addition, a command may identify specific data to be executed on one or more of the nodes 111, 112, 121, and 122. The command may be received from the cloud controller 108, from the PaaS system controller 140, or a user (e.g., a system administrator) via a console computer or a client machine. The image repository may be local or remote and may represent a single data structure or multiple data structures (databases, repositories, files, etc.) residing on one or more mass storage devices, such as magnetic or optical storage based discs, solid-state-drives (SSDs) or hard drives.

In one implementation, the PaaS system may include a pluggable volume manager component 145 that is installed to create volume groups, such as Vols 151,152,153 through 154. These volume groups are used to control the size and location of disk space used by an application image running a container on any of nodes 111, 112, 121, 122. In some implements, the volume manager component 145 operates as a layer between physical storage devices located in the cloud 130 and application images within the containers that write to space on these devices. As a result, the volume manager component 145 is able to ensure that the application images can only write a certain amount of bytes to particular locations on the file system. The volume manager component 145 initially allocates the Vols 151,152,153, 154 and can indicate when application processes of the containers have reached a maximum amount of storage utilization. This storage utilization may include, but is not limited to, a current summation of disk space used by the containers for CPU utilization, memory utilization, block input/output (I/O) utilization, network bandwidth utilization, and so on. The volume manager component 145 communicates with each node 111, 112, 121, 122 and the PaaS system controller 140 in order to control the amount of disk space that the application images use inside of the containers as discussed in more detail further below with respect to FIGS. 2 through 5.

While various implementations are described in terms of the environment described above, the facility may be implemented in a variety of other environments including a single, monolithic computer system, as well as various other combinations of computer systems or similar devices connected in various ways. For example, the volume manager component 145 may be running on a node of the PaaS system hosted by cloud 130, or may execute external to cloud 130 on a separate server device. In some implementations, the volume manager component 145 may include more components that what is shown that operate in conjunction with the PaaS system. For example, the volume manager component 145 may access a Logical Volume Management (LVM)/device mapper (devmapper) utility of a host operating system (e.g., Linux) to obtain the benefits of the techniques described herein. In another example, data from the application image may run directly on a physical host 110, 120 instead of being instantiated on nodes 111, 112, 121, 122. In some implementations, an environment other than a VM may be used to execute functionality of the PaaS applications. As such, in some implementations, a "node" providing computing functionality may provide the execution environment for an application of the PaaS system. The "node" may refer to a VM or any other type of computing environment.

Figure 2:
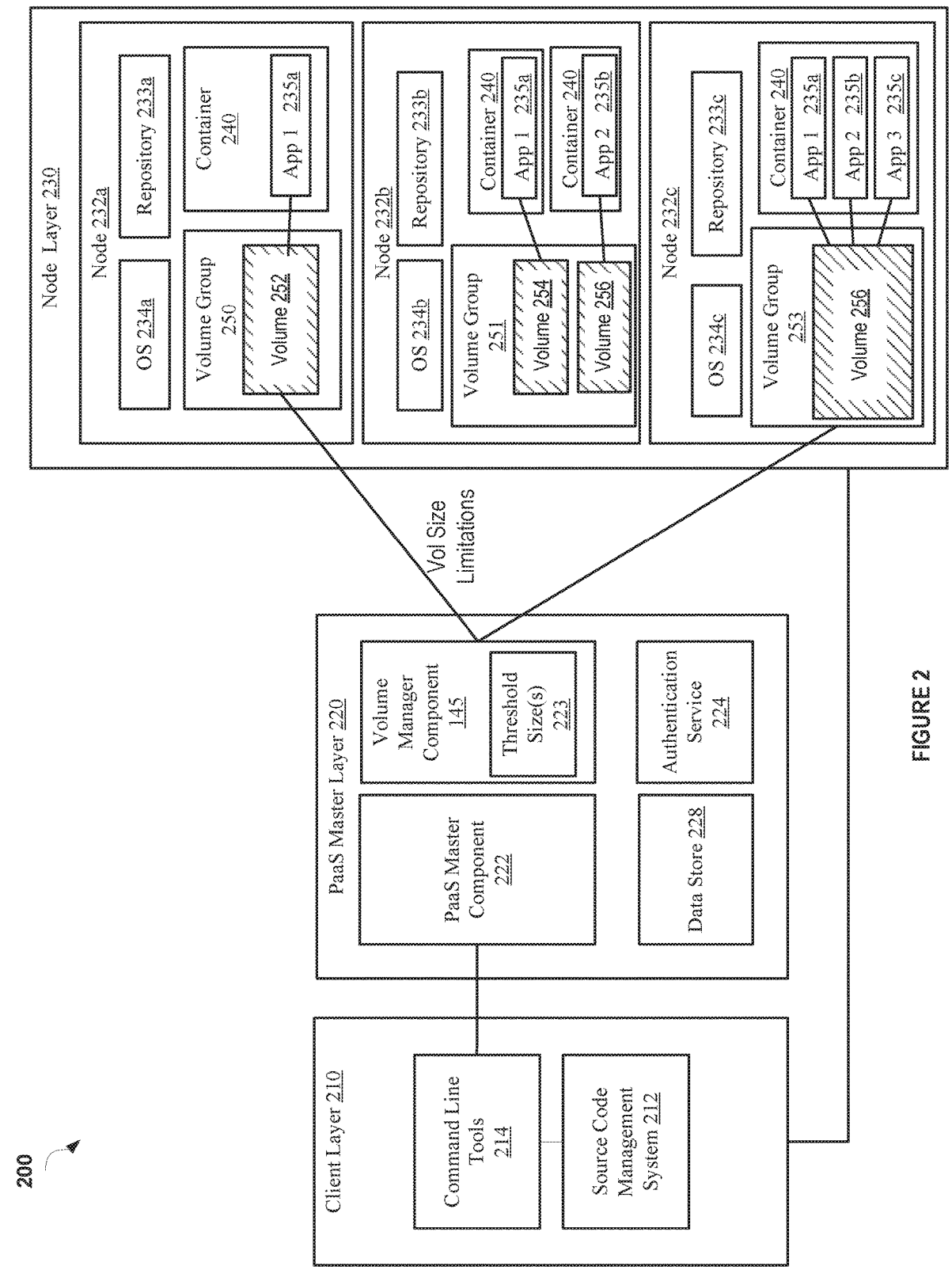
FIG. 2 is a block diagram of a Platform-as-a-Service (PaaS) system architecture according to an implementation of the disclosure.

FIG. 2 is a block diagram of a Platform-as-a-Service (PaaS) system architecture 200 according to an implementation of the disclosure. The PaaS system architecture 200 allows users to launch software applications in a cloud computing environment, such as cloud computing environment provided in network architecture 100 described with respect to FIG. 1. The PaaS system architecture 200, in one implementation, includes a client layer 210, a PaaS master layer 220, and a node layer 230.

In one implementation, the components of the PaaS system architecture 200 are in communication with each other via a network (not shown). The network may include, for example, the Internet in one implementation. In other implementations, other networks, wired and wireless, such as an intranet, local area network (LAN), wide area network (WAN), or broadcast network may be used.

In one implementation, the client layer 210 resides on a client machine, such as a workstation of a software developer, and provides an interface to a user of the client machine to the PaaS master layer 220 and the node layer 230 of the PaaS system 200. In one implementation, the client machine can be a client 160, 170, 180 described with respect to FIG. 1. The PaaS master layer 220 may facilitate the creation and deployment on the cloud (via node layer 230) of software applications being developed by an end user at client layer 210.

In one implementation, the client layer 210 includes a source code management system 212, sometimes referred to as "SCM" or revision control system. One example of such an SCM or revision control system is Git, available as open source software. Another example of an SCM or revision control system is Mercurial, also available as open source software. Git, Mercurial, and other such distributed SCM systems typically include a working directory for making changes, and a local software repository for storing the changes for each application associated with the end user of the PaaS system 200. The packaged software application can then be "pushed" from the local SCM repository to a remote SCM repository, such as repositories 233a, 233b, 233c, at the node(s) 232a, 232b, 232c running the associated application. From the remote SCM repository 233a, 233b, 233c, code of the packaged software application may be edited by others with access, or the application may be executed by a machine. Other SCM systems work in a similar manner.

The client layer 210, in one implementation, also includes a set of command line tools 214 that a user can utilize to create, launch, and manage applications using a PaaS system. In one implementation, the command line tools 214 can be downloaded and installed on the user's client machine, and can be accessed via a command line interface or a graphical user interface, or some other type of interface. In one implementation, the command line tools 214 expose an application programming interface ("API") of the PaaS master layer 220 and perform other applications management tasks in an automated fashion using other interfaces, as is described in more detail further below in accordance with some implementations.

In one implementation, the PaaS master layer 220 acts as middleware between the client layer 210 and the node layer 230. The node layer 230 includes the nodes 232a-c on which applications 235a-c are provisioned and executed. In one implementation, each node 232a-c is a VM. In some implementations, the VMs are provisioned by an Infrastructure as a Service (IaaS) provider. In other implementations, the nodes 232a-c may be physical machines or VMs residing on a single physical machine. In one implementation, the PaaS master layer 220 is implemented on one or more machines, such as server computers, desktop computers, etc. In some implementations, the PaaS master layer 220 may be implemented on one or more machines separate from machines implementing each of the client layer 210 and the node layer 230, or may be implemented together with the client layer 210 and/or the node layer 230 on one or more machines, or some combination of the above.

In one implementation, the PaaS master layer 220 includes a PaaS master component 222 that coordinates requests from the client layer 210 with actions to be performed at the node layer 230. Examples of the requests can include a request to create an application, a request to perform an action (e.g., creating, removing, and/or managing a container) on a container, such as container 240, a request to deploy source code of an application, a request to designate a system to host a remote SCM repository (e.g., an indication that a system has been designated by a user to host a remote SCM repository), etc.

In one implementation, a user, using the command line tools 214 at client layer 210, can request the creation of a new application 235a-c, deployment of source code of the application 235a-c, the designation of a system that hosts a remote SCM repository, etc. In response to receiving such a request, the PaaS master component 222 may first authenticate the user using an authentication service 224. In one implementation, the authentication service 224 may comprise custom authentication methods, or standard protocols such as SAML, Oauth, etc. Once the user has been authenticated and allowed access to the PaaS system by authentication service 224, the PaaS master component 222 uses a server orchestration system 226 to collect information about the nodes 232a-c.

In one implementation, the information collected about the nodes 232a-c can be stored in a data store 228. In one implementation, the data store 228 can be a locally-hosted database or file store, or it can be a cloud-based storage service provided by a Software-as-a-Service (SaaS) provider. The PaaS master component 222 uses the information about the nodes 232a-c and their applications 235a-c to model the application hosting service and to maintain records about the nodes. In one implementation, data of a node 232a-c is stored in the form of a JavaScript™ Object Notation (JSON) blob or string that maintains key-value pairs to associate a unique identifier, a hostname, a list of applications, and other such attributes with the node.

In implementations of the disclosure, the PaaS system architecture 200 of FIG. 2 is a multi-tenant PaaS environment. In a multi-tenant PaaS environment, each node 232a-c runs multiple applications 235a-c that may be owned or managed by different users (e.g., owners) and/or organizations. As such, a first customer's deployed applications 235a-c may co-exist with any other customer's deployed applications on the same node 232 that is hosting the first customer's deployed applications 235a-c. In some implementations, portions of an application execute on multiple different nodes 232a-c. For example, as shown in FIG. 2, components of application 1 235a run in both node 232a and node 232b. Similarly, components of application 2 235b may run in node 232b and node 232c.

In one implementation, each node 232a-c is implemented as a VM and has an operating system 234a-c that can execute applications 235a-c using the repositories 233a-c that are resident on the nodes 232a-c. Each node 232a-c also includes a server orchestration system agent (not shown) to track and collect information about the node 232a-c and to perform management actions on the node 232a-c. The server orchestration system agent may operate in tandem with the server orchestration system 226 to send requests, queries, and commands between the node 232a-c and the PaaS master layer 220.

As discussed above, node 232a-c runs multiple applications 235a-c. A node 232a-c runs an application by launching an instance of an application image in a container 240 on the node 232a-c. An application image includes the underlying support software that implements the functionality of applications 235a-c. An application image for an application may be built at build system (not shown), which may be separate from or part of node layer 230. The build system may generate an application image from a combination of pre-existing ready-to-run application images related to core functionality of the application and source code provided by a user of the application.

For example, the pre-existing ready-to-run application images may include support software providing functionality (e.g., configuration templates, scripts, dependencies, etc.) used to run the application 235a-c and/or add a feature to the application 235a-c. For example, the images may support languages such as, but not limited to, Java™, PHP, Ruby, Python, Perl, and so on. In addition, application images may be generated that support databases, such as MySQL™, PostgreSQL™, Mongo™, and others. Pre-existing ready-to-run application images may also include those that support the build and continuous integration environments, such as a Jenkins-based image. Lastly, pre-existing ready-to-run application images may be used to support management capabilities and/or tools, such as PHPmyadmin, RockMongo™, 10gen-mms-agent, cron scheduler, and HAProxy, Maven, and Gradle, for example.

Application image instances for an application 235a-c launched in containers 240 may be dispersed over more than one node 232a-b. In other implementations, application images instances for an application 235a-c may run in one or more containers 240 on the same node 232a-c. Furthermore, an application 235a-c may use more than one application image as part of providing functionality for the application 235a-c. One example of this is a JavaEE™ application that uses a JBoss™ application server-based application image with a supporting MySQL™ database provided by a MySQL™ based application image.

Each application image built at build system may map to a functional component of the application 235a-c. As such, an application may have more than one application image associated with the application. Built application images may be pushed to image repository for storage and accessibility for subsequent use in launching instances of the application images at containers 240 in nodes 232a-c.

A container 240 is a secure process space on the node 232a-c to execute functionality of an application 235a-c. In some implementations, a container 240 is established at the nodes 232a-c with access to certain resources of the underlying node 232a-232c, including memory, storage, and security types and/or labels to be applied to any functions executed by the container 240. In one implementation, the containers 240 may be established using the Linux Containers (LXC) method. In further implementations, containers 240 may also be established using cgroups, SELinux™, and kernel namespaces, to name a few examples.

In one implementation, the PaaS system 200 includes a volume manager component 145 to control the size of volume groups 250, 251, 253 established on the nodes 232a-c. In one implementation, volume manager component 145 is the same as the volume manager component 145 described with respect to FIG. 1. The volume manager component 145 is capable of accessing the nodes 232a-c running in the PaaS system 200 and executing commands against those nodes 232a-c. For example, the volume manager component 145 can create a volume group and separate that group out into certain volumes, such as volumes 252, 254, 256, 258 that are then mounted onto the containers 240 on the nodes 232a-c in order to control where and how much disk space each of the containers 240 can use. In some implementations, the volume manager component 145 may manage a plurality of volume groups 250, 251, 253. Each of the volume groups 250, 251, 253, represents a logical collection of disks that may be mapped across a plurality of physical storage devices. The volume groups 250, 251, 253 can have names assigned to each them, such as a user string identifier, ASCII or the like.

The volume manager component 145 can allocated a different amount of the disk space to each of the volume groups 250, 251, 253. For example, a system administrator or a PaaS system 200 provider may allocate space for the groups in view of a system policy, available resources, a pre-existing agreement and other types of factors. In some implementations, each of the volume groups 250, 251, 253 can be divided into volumes that are associated with one or more containers 240. As shown in FIG. 2, volume group 250 includes volume 252 that is mounted onto one container 240 and volume group 251 includes volumes 254 and 256, which are mounted onto two containers 240, while volume group 256 is mounted onto one container 240. In this regard, each of the volume groups 250, 251, 253, can be associated with a plurality of containers so long as the volumes mounted onto these containers in a particular volume group do not together violate the allocated size of that volume group.

In one implementation, the volume manager component 145 allows the PaaS system 200 to overcommit its storage space to increase the number of containers 240 that the system can host. For example, each container 240 can write to a certain amount of disk space in view of a threshold size of the disk space that can be used in its volume group. It is expected that the container 240 may use only a portion of this space at any given time. As such, the PaaS system 200 may overcommit the actually disk space to a plurality of containers. For example, if there is only 100 GB of actual disk space, the PaaS system 200 may allocate this disk space to 300 containers, with 1 GB of disk space per each container. This is because the containers initially utilize a small amount of disk space, and then slowly grow in size to fill the disk space allocated to the container. As such, the 300 containers can be put in the same volume group, which allows the actual disk space to be overcommitted.

The threshold size 223 of the disk space used in of each of the volume groups 250, 251, 253, may be in view of an agreement with a particular client associated with the applications 235a-c running in a particular container 240. For example, a client associated with the client layer 210 may send a request to the PaaS system 200 to allocate a certain amount of space for use inside of a container associated with the client at a particular cost. The PaaS system 200 may allocate this space by using the volume manager component 145 to create a volume group of a limited size that has a volume mounted to the client's container.

If the client's container runs out of space (e.g., threshold size of used disk space is reached) to write to in the volume, the system administrator of the PaaS system 200 may allocate more space to the container at an additional cost to the client. In view of the agreements that are in place with the client, the administrator can then adjust as needed the size of the volume group so that the container does not run out of writeable space. For example, the administrator can send a command to the volume manager component 145 via an interface (not shown) of the PaaS system 200 that instructs the volume manger 145 to allocate or otherwise map more disk space to the volume group associated with the client's container. Otherwise, the application may be permitted to fail or, in some situations, the PaaS system 200 may explicitly terminate the application, and then the client may be alerted that the container's limit has been reached. For example, the PaaS system 200 may provide an alert to the client layer 210 indicating the application has failed execution because its container is out of space to write data.

Figure 3:
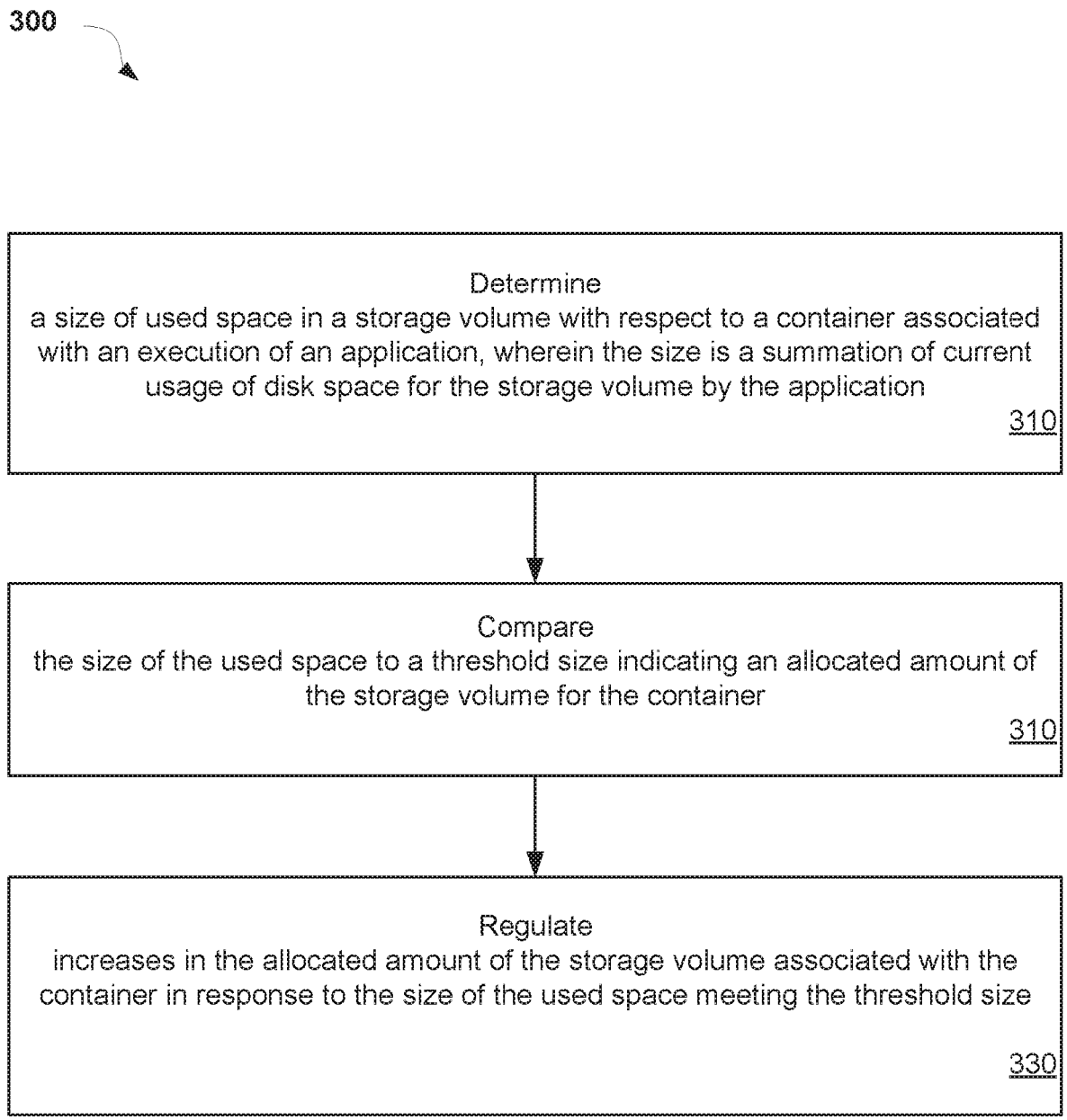
FIG. 3 illustrates a flow diagram illustrating a method for size adjustable volumes for containers according to an implementation of the disclosure.

FIG. 3 illustrates a flow diagram illustrating a method 300 for size adjustable volumes for containers according to an implementation of the disclosure. In one implementation, the volume manager component 145 of FIG. 1 may perform method 300. The method 300 may be performed by processing logic that may comprise hardware (circuitry, dedicated logic, etc.), software (e.g., software executed by a general purpose computer system or a dedicated machine), or a combination of both. In alternative implementations, some or all of the method 300 may be performed by other components of a PaaS system. It should be noted that blocks depicted in FIG. 3 can be performed simultaneously or in a different order than that depicted.

Method 300 begins at block 310 where a size of used space in a storage volume with respect to a container associated with an execution of an application may be determined. In this regards, the size is a summation of current usage of disk space for the storage volume by the application. For example, this may include a current summation of disk space used by the application for data storage, CPU utilization, memory utilization, block input/output (I/O) utilization, network bandwidth utilization, and so on. In block 320, the size of the used space may be compared to a threshold size indicating a determined amount of the storage volume allocated to the container. Increases in the in the allocated amount of the storage volume associated with the container may be regulated in block 330, in response to the size of the used space meeting the threshold size. For example, an application executing inside the container may be permitted to fail or may be terminated. Thereupon, an alert or error message is generated indicating the container is out of space for the application to execute. Alternatively, additional disk space may be mounted onto the storage volume for allocation to the container.

FIG. 4 illustrates a flow diagram of a method 400 for providing a size adjustable volume for a container according to an implementation of the disclosure. In one implementation, the volume manager component 145 of FIG. 1 may perform method 400. The method 400 may be performed by processing logic that may comprise hardware (circuitry, dedicated logic, etc.), software (e.g., software executed by a general purpose computer system or a dedicated machine), or a combination of both. In alternative implementations, some or all of the method 400 may be performed by other components of a PaaS system. It should be noted that blocks depicted in FIG. 4 can be performed simultaneously or in a different order than that depicted.

Method 400 begins at block 410 where a request to map a storage volume to a container associated with an execution of an application is received. In some implementations, the request comprises a size limitation (i.e., disk space size) for the storage volume. For example, a client may send a request to a PaaS system, such as PaaS system 200, to allocate a certain amount of writeable disk space for use by a client application within a container. The system administrator or PaaS system provider may set a size limitation on the storage volume, for example, in view of a system policy, available resources, or a pre-existing agreement. In block 420, a size of used space in the storage volume with respect to the container is obtained. This size is a summation of current usage of disk space associated with the storage volume by the application. A determination is made as to whether the size of the used space meets the size limitation for the storage volume in block 430. In block 440, increases in the size limitation for the for the storage volume mapped to the container are controlled in view of the determination. For example, the PaaS system may prevent or provide for an increase in the size limitation for the for the storage volume in view of a pre-arranged agreement with the client.

Figure 5:
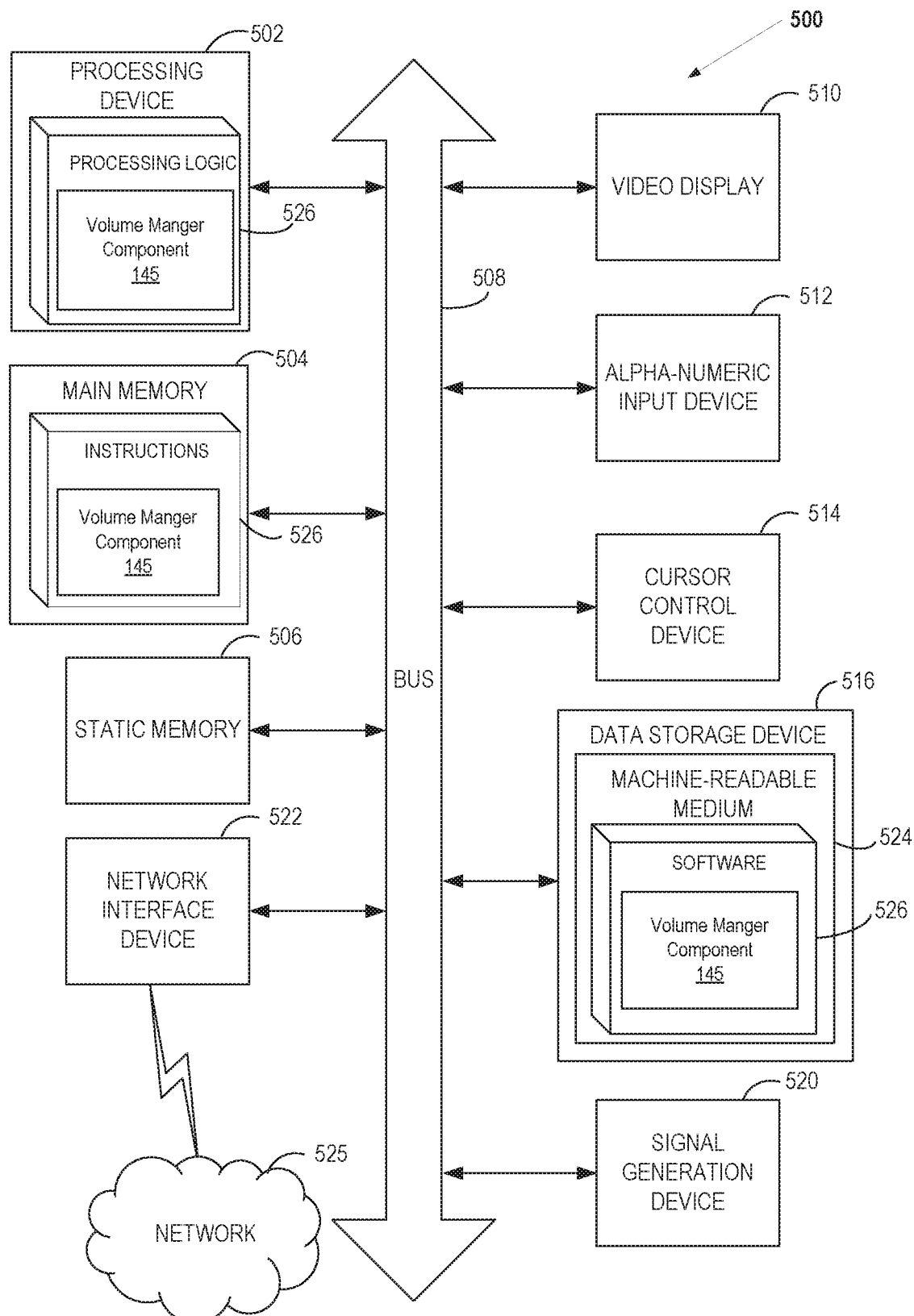
FIG. 5 illustrates a block diagram illustrating a computer system in which implementations of the disclosure may be used.

FIG. 5 illustrates a diagrammatic representation of a machine in the example form of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 500 includes a processing device 502, a main memory 504 (e.g., read-only memory (ROM), flash memory, dynamic random access memory (DRAM) (such as synchronous DRAM (SDRAM) or DRAM (RDRAM), etc.), a static memory 506 (e.g., flash memory, static random access memory (SRAM), etc.), and a data storage device 518, which communicate with each other via a bus 508.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is to execute the processing logic 526 for performing the operations and steps discussed herein.

The computer system 500 may further include a network interface device 522 communicably coupled to a network 564. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a non-transitory machine-accessible storage medium 524 on which is stored software 526 embodying any one or more of the methodologies of functions described herein. The software 526 may also reside, completely or at least partially, within the main memory 504 as instructions 526 and/or within the processing device 502 as processing logic 526 during execution thereof by the computer system 500; the main memory 504 and the processing device 502 also constituting machine-accessible storage media.

The non-transitory machine-readable storage medium 524 may also be used to store instructions 526 to implement a volume manger component 145 to provide size adjustable volumes for containers in a system, such as the PaaS system described herein, and/or a software library containing methods that call the above applications. While the machine-accessible storage medium 524 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

It is to be understood that the above description is intended to be illustrative, and not restrictive. Many other implementations are apparent upon reading and understanding the above description. The scope of the disclosure should, therefore, be determined with reference to the appended claims, along with the full scope of equivalents to which such claims are entitled.

In the above description, numerous details are set forth. It is apparent, however, that the disclosure may be practiced without these specific details. In some instances, structures and devices are shown in block diagram form, rather than in detail, in order to avoid obscuring the disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "monitoring", "comparing", "determining", "preventing", "mapping", "obtaining", "controlling" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems appears as set forth in the description below. In addition, the disclosure is not described with reference to any particular programming language. It is appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
   determining, by a processing device of a Platform-as-a-Service (PaaS) system, a size limitation of a container, wherein the size limitation is associated with disk space usage of a storage volume group;
   monitoring an amount of disk space used by applications of the container in view of the size limitation of the container; and
   responsive to determining that the amount of the disk space used by the applications of the container satisfies a threshold, allocating, by the processing device, a storage volume of the storage volume group to the container in view of the size limitation of the container, and managing the size limitation of the container in view of a service level agreement associated with the container, wherein the service level agreement is associated with an amount of the storage volume of the storage volume group to allocate to the container.

2. The method of claim 1, further comprising generating an alert indicating that a previously allocated storage volume is out of space for the container.

3. The method of claim 1, wherein allocating the storage volume comprises mapping a storage device associated with the storage volume to the storage volume group.

4. The method of claim 1, further comprising:
   determining an updated amount of the disk space used by the applications of the container; and
   responsive to determining that the updated amount of the disk space used by the applications of the container satisfies the threshold, allocating an additional storage volume to the container in view of the size limitation of the container.

5. The method of claim 1, further comprising determining a size of the storage volume to map in view of the service level agreement associated with the container.

6. The method of claim 5, further comprising:
   responsive to detecting that the service level agreement does not provide for mapping the storage volume to the container, terminating an execution of the applications.

7. The method of claim 1, wherein the storage volume group supports overcommitting of the disk space used by the applications of the container.

8. A system comprising:
   a memory to store a storage volume group; and
   a processing device coupled to the memory, the processing device to:
   determine a size limitation of a container, wherein the size limitation is associated with disk space usage of a storage volume group;
   monitor an amount of disk space used by applications of the container in view of the size limitation of the container; and
   responsive to determining that the amount of the disk space used by the applications of the container satisfies a threshold, allocate a storage volume of the storage volume group to the container in view of the size limitation of the container, and manage the size limitation of the container in view of a service level agreement associated with the container, wherein the service level agreement is associated with an amount of the storage volume of the storage volume group to allocate to the container.

9. The system of claim 8, wherein the processing device is further to generate an alert indicating that a previously allocated storage volume is out of space for the container.

10. The system of claim 8, wherein to allocate the storage volume, the processing device is further to map a storage device associated with the storage volume to the storage volume group.

11. The system of claim 8, wherein the processing device is further to:
    determine an updated amount of the disk space used by the applications of the container; and
    responsive to determining that the updated amount of the disk space used by the applications of the container satisfies the threshold, allocate an additional storage volume to the container in view of the size limitation of the container.

12. The system of claim 8, wherein the processing device is further to determine a size of the storage volume to map in view of the service level agreement associated with the container.

13. The system of claim 12, wherein the processing device is further to:
    responsive to detecting that the service level agreement does not provide for mapping the storage volume to the container, terminate an execution of the applications.

14. The system of claim 8, wherein the storage volume group supports overcommitting of the disk space used by the applications of the container.

15. A non-transitory computer-readable storage medium comprising executable instructions that when executed, by a processing device, cause the processing device to:
    determine a size limitation of a container, wherein the size limitation is associated with disk space usage of a storage volume group;
    monitor an amount of disk space used by applications of the container in view of the size limitation of the container; and
    responsive to determining that the amount of the disk space used by the applications of the container satisfies a threshold, allocate a storage volume of the storage volume group to the container in view of the size limitation of the container, and manage the size limitation of the container in view of a service level agreement associated with the container, wherein the service level agreement is associated with an amount of the storage volume of the storage volume group to allocate to the container.

16. The non-transitory computer-readable storage medium of claim 15, wherein the processing device is further to generate an alert indicating that the storage volume is out of space for the container.

17. The non-transitory computer-readable storage medium of claim 15, wherein to map the storage volume, the processing device is further to map a storage device associated with the storage volume to the storage volume group.

18. The non-transitory computer-readable storage medium of claim 15, wherein the processing device is further to:
   determine an updated amount of the disk space used by the applications of the container; and
   responsive to determining that the updated amount of the disk space used by the applications of the container satisfies the threshold, allocate an additional storage volume to the container in view of the size limitation of the container.

19. The non-transitory computer-readable storage medium of claim 15, wherein the processing device is further to determine a size of the storage volume to map in view of the service level agreement associated with the container.

20. The non-transitory computer-readable storage medium of claim 19, wherein the processing device is further to:
   responsive to detecting that the service level agreement does not provide for mapping the storage volume to the container, terminate an execution of the applications.

* * * * *